US006883655B2

(12) United States Patent
Stefina et al.

(10) Patent No.: US 6,883,655 B2
(45) Date of Patent: Apr. 26, 2005

(54) VARIABLE TORSIONAL DAMPER HAVING MAGNETO-RHEOLOGICAL FLUID DAMPING IN PARALLEL WITH A SPRING DAMPER

(75) Inventors: Brian K. Stefina, Waterford, MI (US); William Vukovich, White Lake Township, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/667,173

(22) Filed: Sep. 19, 2003

(65) Prior Publication Data

US 2005/0061601 A1 Mar. 24, 2005

(51) Int. Cl.[7] .............................. F16D 3/80; F16D 47/02
(52) U.S. Cl. ..................... 192/21.5; 192/55.4; 192/208; 464/24; 464/68
(58) Field of Search ............................... 192/21.5, 200, 192/202, 208, 110 R, 110 B, 70.17, 89.23, 55.4, 30 V; 464/2, 24, 25, 29, 51, 67, 68

(56) References Cited

U.S. PATENT DOCUMENTS

| | | | |
|---|---|---|---|
| 4,813,524 A | 3/1989 | Reik | 192/106.2 |
| 5,579,880 A | * 12/1996 | Feldhaus et al. | 464/29 |
| 5,779,013 A | 7/1998 | Bansbach | 192/21.5 |
| 5,845,753 A | 12/1998 | Bansbach | 192/21.5 |
| 6,095,299 A | * 8/2000 | Peinemann et al. | 464/24 |
| 6,371,267 B1 | 4/2002 | Kao et al. | 192/21.5 |
| 6,412,618 B1 | * 7/2002 | Stretch et al. | 192/21.5 |
| 6,585,092 B1 | * 7/2003 | Smith et al. | 192/21.5 |
| 6,668,995 B1 | * 12/2003 | Janson et al. | 192/208 |

* cited by examiner

*Primary Examiner*—Rodney H. Bonck
(74) *Attorney, Agent, or Firm*—Bliss McGlynn, P.C.; Greg Dziegielewski

(57) ABSTRACT

A variable torsional damper rotatably supported for translating torque between a prime mover and the input of a transmission. The variable torsional damper includes a torque input member operatively connected for rotation with the power take off of a prime mover, an output member operatively connected for rotation with the input to a transmission and a plurality of damping members interposed between the input member and the output member. The damping members act to translate torque between the input member and the output member to dampen torsional forces generated between the prime mover and the transmission. A magneto-rheological damper assembly is disposed in parallel with the damping members and is adapted to operatively vary the hysteresis between the input member and the output member of the variable torsional damper.

15 Claims, 2 Drawing Sheets

VARIABLE TORSIONAL DAMPER HAVING MAGNETO-RHEOLOGICAL FLUID DAMPING IN PARALLEL WITH A SPRING DAMPER

BACKGROUND OF THE INVENTION

1. Field of the Invention

The present invention relates, generally, to torsional dampers and, more specifically, to a variable torsional damper having magneto-rheological fluid damping in parallel to a spring damper.

2. Description of the Related Art

In automotive applications, engine torque and speed are translated between a prime mover, such as an internal combustion engine, to one or more wheels through the transmission in accordance with the tractive power demand of the vehicle. Torsional damping mechanisms are well known in the related art for reducing vibrations and torque pulses between the prime mover and the transmission. In a manual transmission for example, one torsional damping mechanism commonly known in the art includes a plurality of coiled springs mounted in a clutch disk between the input member and the output member that is further connected to the input shaft of the transmission. This arrangement acts to dampen torsional vibrations due to impact loads and pulsations generated between the prime mover and the transmission. Torsional dampers of this type may also be employed between the prime mover and a start-up clutch or a pair of flywheels associated with the prime mover and the transmission, respectively in other types of torque transmitting devices.

Torsional dampers of these known types are generally referred to as fixed hysteresis dampers where the torsional damping depends on the fixed compression rates of the springs. While conventional torsional dampers having fixed compression rates of the type employed in the related art have generally worked for their intended purposes, they are known to suffer from certain disadvantages. For example, it is not uncommon that, during vehicle launch, the torsional damper is subjected to relatively high torque peaks. When this occurs, it is possible for the coiled springs to be over-compressed to the point that they "bottom out." When this occurs, the relative rotation between the drive and driven members is described as "over-travel" and results in the generation of noise and vibration through the vehicle driveline. Over-travel is a condition of "high hysteresis" between the drive and driven members. Over-travel may be combated by employing stiffer coiled springs. However, with the increase in the stiffness of the coiled spring, there is an associated decrease in damping through the torsional damper. On the other hand, following vehicle launch and at high rotational speeds, the input and output members of the torsional damper rotate, for the most part, substantially together so that there is little or no relative rotation therebetween. Thus, the torsional damper operates in a condition of "low hysteresis." In this operative mode, the coiled springs adequately function to absorb the minimal torque pulses and vibrations that may be generated between the prime mover and the transmission.

There have been a number of solutions that have been proposed in the related art to address the problems associated with high hysteresis during launch and a low hysteresis during higher rotational speeds after launch. However, the conventionally known torsional dampers that embody these solutions typically employ a relatively high number of components and an associated increase in cost to address the operational challenges that are placed on the torsional dampers. Likewise, developments in creating variable torsional dampers, where the hysteresis is variable based on varying load conditions also embody many components that add a great deal of weight. The complexities of known approaches to variable torsional dampers also make for prohibitively expensive devices. However, the dynamic damping of variable torsional dampers has proven to be much more effective than fixed torsional dampers. Thus, there is a need in the art for a variable torsional damper that effectively dampens impact loads, pulsations, torque peaks, and vibrations between the prime mover and the transmission, while remaining relatively mechanically simple such that prohibitive weight or cost in producing a variable torsional damper is avoided.

SUMMARY OF THE INVENTION

The deficiencies in the related art are overcome in a variable torsional damper that is rotatably supported for translating torque between a prime mover and the input of a transmission. The variable torsional damper includes a torque input member operatively connected for rotation with the power take off of a prime mover, an output member operatively connected for rotation with the input to a transmission and a plurality of damping elements interposed between the input member and the output member. The damping members act to translate torque between the input and the output members and to dampen torsional forces generated between the prime mover and the transmission. A magneto-rheological damper assembly is disposed in parallel with the damping elements that is adapted to operatively vary the hysteresis between the input member and the output member of the variable torsional damper.

In this way, the magneto-rheological damper assembly works in connection with the damping members to provide a torsional damper that can effectively handle instances of high hysteresis during launch and a low hysteresis during higher rotational speeds after launch, thereby avoiding bottoming-out and over-travel conditions. Thus, the variable torsional damper of the present invention adequately addresses the problems associated with high hysteresis during launch and low hysteresis at high rotational speeds. Further, the number of components of the variable torsional damper of the present invention are relatively few, and the components employed are generally lightweight. Thus, the present invention effectively dampens impact loads, pulsations, torque peaks, and vibrations between the prime mover and the transmission, while remaining relatively mechanically simple and avoiding adding prohibitive weight or cost to the variable torsional damper.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
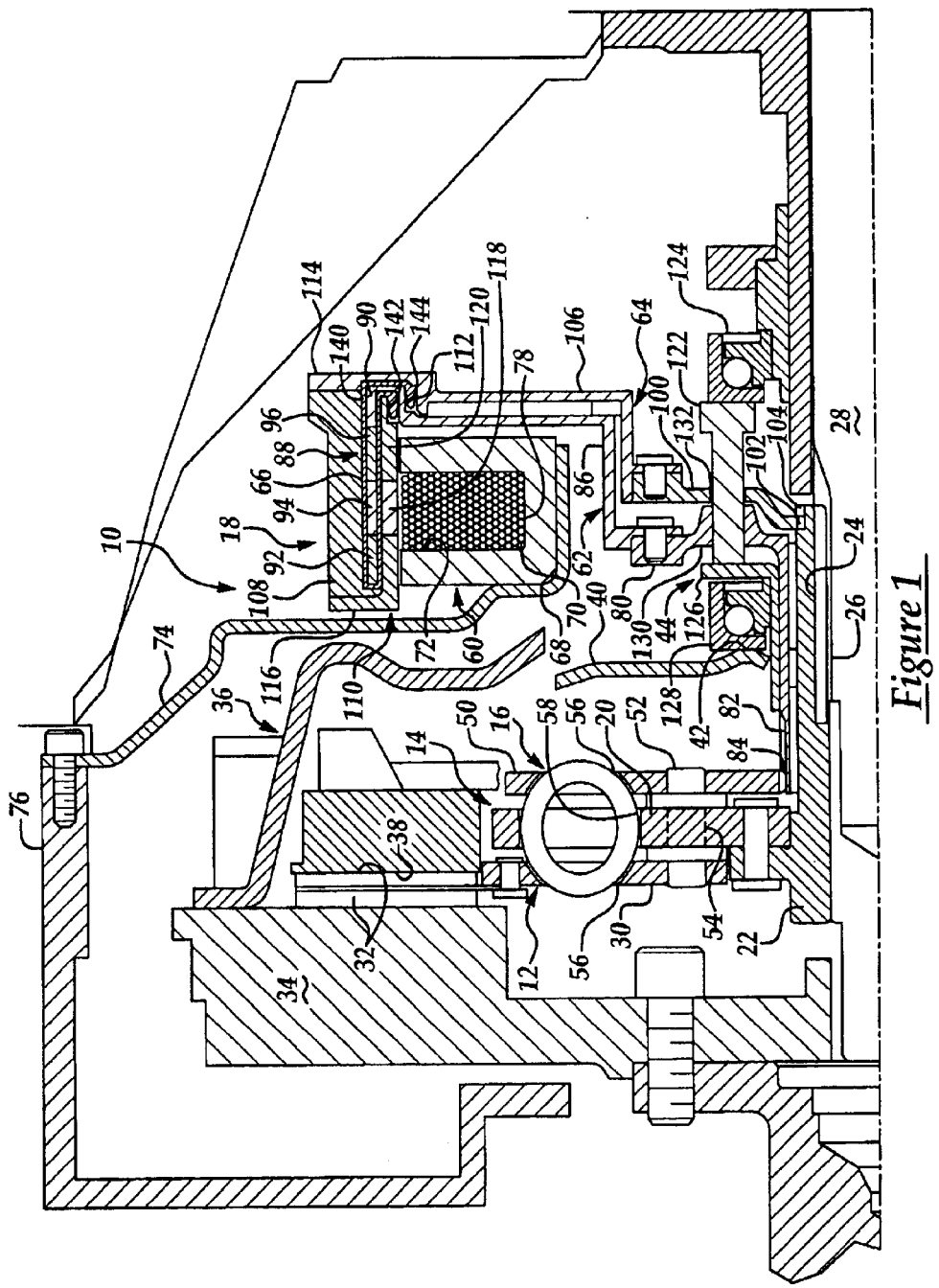
FIG. 1 is a cross-sectional side view of the variable torsional damper of the present assembly.

Referring now to the figures, where like numerals are used to describe like structure, a variable torsional damper that is adapted to be rotatably supported for translating torque between a prime mover such as an internal combustion engine (not shown) to the input shaft of a transmission, is generally indicated at 10. The transmission may then subsequently distribute this power to one or more wheels (not shown) through other drivetrain components such as a drive shaft and an axle having a differential (also not shown). While the preferred embodiment of the present invention is illustrated herein as a portion of a clutch disk and pressure plate assembly, those having skill in the art will understand that the variable torsional damper of the present invention may be employed in connection with other types of torque transmission devices as well. Likewise, as the variable torsional damper illustrated in these figures is particularly adapted for use with an automotive vehicle, it should be appreciated that the present invention may also be employed with other types of transmissions.

The variable torsional damper 10 includes a input member, generally indicated at 12 that is selectively coupled to an engine as power take-off; an output member, generally indicated at 14, that is operatively connected for rotation with the input to the transmission, and a plurality of damping members, generally indicated at 16, that are interposed between the input member 12 and the output member 14. The damping members 16 act to translate torque between the input and the output members 12, 14, respectively, and to dampen torsional forces generated between the prime mover and the transmission. The variable torsional damper 10 further includes a magneto-rheological damper assembly generally indicated at 18 that is disposed in parallel with the damping elements 16. The magneto-rheological damper assembly 18 is adapted to operatively vary the hysteresis between the input and the output members 12 and 14 of the variable torsional damper 10 as will be described in greater detail below.

The output member 14 includes a plate 20 that is mounted to an engagement sleeve 22 in a conventional manner. The engagement sleeve 22 is internally splined at 24 to engage with a like splined portion 26 of the transmission input shaft 28. The input member 12 includes a clutch disk plate 30 having friction material 32 that is adapted to slidingly rotate between the engine flywheel 34 and a clutch pressure plate assembly generally indicated at 36. The pressure plate 36 includes a pressure surface 38 that is normally spring biased to clampingly force the friction material 32 of the clutch disk plate 30 to the flywheel 34. Thus, the pressure plate 36 causes the flywheel 34 to be engaged to and transfer torque to the input member 12. The pressure plate 36 also has a plurality of radial fingers 40 that are adapted to overcome the spring biasing and allow the pressure surface 38 to be withdrawn from the friction material 32 of the clutch disk 30, thereby selectively disengaging the transmission from the engine. Each of the plurality of fingers 40 have an engagement lip 42. The fingers 40 are actuated to disengage the pressure plate 36 by forcing them inward (to the left as illustrated in FIG. 1) at the engagement lip 42 with a throwout bearing assembly, generally indicated at 44. The throwout bearing assembly 44 will be discussed in greater detail below.

The input member 12 also includes a second plate 50. The second plate 50 is disposed coaxial to the clutch disk plate 30 with the output member 14 disposed therebetween. The clutch disk plate 30 and the second plate 50 are operatively connected together by a plurality of pins 52 that pass through a like plurality of slotted pin openings 54 in the output member 14. Thus, the clutch disk plate 30 and the second plate 50 are fixed to each other, and are capable of operatively rotating relative to the outer member 14 as limited by the length of the slotted openings 54. Further, the clutch disk plate 30 and the second plate 50 are formed with radial apertures 56 that accept and retain the damping members 16. The output member 14 also has radial apertures 58 that correspondingly accept and retain the damping members 16.

In this manner, the apertures 56 are formed so that the ends of the damping members 16 are in contact with the ends of the apertures 56. Likewise, the apertures 58 in the output member 14 are also formed so that the ends of the damping members 16 are in contact with the ends of the apertures 58. Thus, as the input member 12 rotates relative to the output member 14, or the output member 14 rotates relative to the input member 12, the damping members 16 provide a damping action to the relative rotation. This damping action is a spring hysteresis that is fixed and depends on the compression rate of the damping members 16.

As previously mentioned, the variable torsional damper 10 further includes a magneto-rheological damper assembly 18 that is disposed in parallel with the damping elements 16. The magneto-rheological damper assembly 18 is adapted to operatively vary the hysteresis between the input and the output members 12 and 14 of the variable torsional damper 10. More specifically, the magneto-rheological damper assembly 18 includes an electromagnetic coil assembly generally indicated at 60, an inner disk assembly generally indicated at 62, an outer disk assembly generally indicated at 64, and a magneto-rheological fluid cavity 66.

The electro-magnetic coil assembly 60 includes an electro-magnetic coil 68. The magnetic coil 68 is a "U"-shaped magnetic core formed in an annular ring and having a wire winding 70 wound into the "U" shaped opening 72 that is radially and outwardly oriented from the central axis of the transmission. The magnetic coil 68 is fixedly mounted to a support yoke 74 that is generally conical in shape and surrounds the pressure plate 36 and engine flywheel 34. The support yoke 74 extends from the magnetic coil 68 and is fixedly mounted to the case 76 of the transmission. The support yoke 74 is formed to support the magnetic coil 68 about its inner circumference 78. It should be appreciated that the support yoke 74 may be generally solid and formed to surround the area containing the pressure plate 36 and engine flywheel 34 or it may be a series of separate brackets spaced about the circumference of the transmission case 76 and extending inward to support the magnetic coil 68.

The winding 70 of the magnetic coil 68 is operatively connected to, and is in electrical communication with, a controlled power source, so that at a predetermined time the magnetic coil 68 can be energized to produce a magnetic field of a predetermined and variable strength that relates to the desired amount of hysteresis. The inner disk assembly 62 includes a connection sleeve 80 that has a splined portion 82 that engages a like splined portion of the second plate 50 at 84. In this way, the inner disk assembly 62 is operatively connected to the input member 12. The inner disk assembly 62 further includes a riser portion 86 and a flux-shaping ring 88. The riser portion 86 operatively connects the connection sleeve 80 to the flux-shaping ring generally indicated at 88. The flux shaping 88 is made of mild steel, which is magnetically permeable to allow the passage and channeling of the magnetic lines of flux from the magnetic coil 68 as will be discussed in greater detail below.

As seen in FIG. 1, the riser portion 86 is generally "L" shaped with a hooked end 90 that mounts to the flux-shaping ring 88. The riser portion 86 is constructed of a non-magnetically permeable material. In the preferred embodiment of the present invention, stainless steel is used for the non-magnetically permeable material. The stainless steel riser 86 prevents the magnetic lines of flux generated by the magnetic coil 68 from the moving laterally away from the magnetic coil 68, as will be discussed in greater detail below. The flux-shaping ring 88 is formed as an annular ring that extends over the open winding area of the magnetic coil 68. In the preferred embodiment illustrated in FIG. 1, the flux-shaping ring 88 includes three separate annular rings, the outer rings 92 and 96, and the center ring 94. The rings are fixedly mounted together. The center ring 94 is made of stainless steel and blocks the passage of the magnetic flux lines, the two outer rings 92 and 96, mounted abreast of the stainless steel center ring 94, are made of mild steel and allow the magnetic lines of flux to pass through.

The outer disk assembly 64 includes a connection ring 100 that has a splined portion 102 that engages a like splined portion of the outer member 14 at 104. In this way, the outer disk assembly 64 is operatively connected to the output member 14. The outer disk assembly 64 further includes a riser portion 106, a flux-channeling ring 108, and a flux-shaping ring generally indicted at 110. The riser portion 106 operatively connects the connection ring 100 to the flux-channeling ring 108 and the flux-shaping ring 110. As seen in FIG. 1, the riser portion 106 is generally "L" shaped with a ledge 112 that provides a sealing surface for the riser portion 86 of the inner disk assembly 62 and a connection end 114 that mounts to the flux-channeling ring 108. The riser portion 106 is constructed of stainless steel. The stainless steel riser 106, being non-magnetic with very low magnetic permeability, prevents the generated magnetic lines of flux from the moving laterally away from the magnetic coil 68.

The flux-channeling ring 108 is formed as an annular ring that is mounted radially outward from the flux-shaping ring 88 of the inner disk assembly 62. It is made of mild steel, which is magnetically permeable to allow the passage and channeling of the magnetic lines of flux from the magnetic coil 68. The flux-channeling ring 108 is further connected to the "L-shaped" flux-shaping ring 110, which is also formed as an annular ring that extends over the open winding area of the magnetic coil 68. Similar to the flux-shaping ring 88 of the inner disk assembly 62, the flux-shaping ring 10 of the outer disk assembly 64 includes three separate annular rings. More specifically, the flux-shaping ring 10 has two outer rings 116 and 120, and a center ring 118, that are fixedly mounted together. The center ring 118 is made of stainless steel and blocks the passage of the magnetic flux lines, the other two rings 116 and 120, which are mounted abreast of the stainless steel center ring 18, are made of mild steel and allow the magnetic lines of flux to pass through, as will be discussed in greater detail below.

The throwout bearing assembly 44 further includes a plurality of pushrods 122, a first bearing 124, a pushrod sleeve 126, and a second bearing 128. As shown in FIG. 1, both the connecting sleeve 80 of the inner disk assembly 62 and connection ring 100 of the outer disk assembly 64 have a plurality of slots 130 and 132 respectively. Each of the plurality of pushrods 122 passes through a corresponding pair of aligned slots 130 and 132. One end of each of the plurality of pushrods 122 is in rotatively sliding contact with a first bearing 124. The first bearing 124 is further engaged by a typical throwout arm or lever (not shown), which causes a linear movement of the first bearing 124 when it is desired to disengage the clutch. The opposite ends of pushrods 122 are fixedly mounted to the pushrod sleeve 126, which is in rotatively sliding contact with the second bearing 128. The second bearing 128 is also in rotatively sliding contact with the engagement lips 42 of each of the fingers 40 of the pressure plate 36. As the clutch is disengaged, the throwout arm causes the first bearing 124 to move to the left as illustrated in FIG. 1. This further causes the pushrods 122 to move the pushrod sleeve 126 and the second bearing 128 also to the left, which subsequently puts pressure on the fingers 40 of the pressure plate 36 to remove the clutch engagement force from the pressure plate 36, the clutch disk plate 30, and the flywheel 34.

The plurality of slots 130 and 132 are circumferentially formed in the connecting sleeve 80 of the inner disk assembly 62 and connection ring 100 of the outer disk assembly 64. The plurality of slots 130, 132 have an arcuate length such that the inner and outer disk assemblies 62 and 64 can deflect angularly from each other. In the preferred embodiment of the present invention, the circumferential arcuate length of the plurality of slots 130 and 132 allow for a combined angular deflection of 25 degrees between the inner and outer disk assemblies 62 and 64. It should be appreciated that the maximum deflection angle may be made larger or smaller depending upon the application and the total desired variation of hysteresis. It should be further appreciated that the slots 130, 132 allow for angular deflection of the inner and outer disk assemblies 62 and 64 in either relative angular direction. Thus, as will be discussed in greater detail below, the magneto-rheological damper assembly 18 can selectively vary the damping hysteresis in either angular direction.

Figure 2:
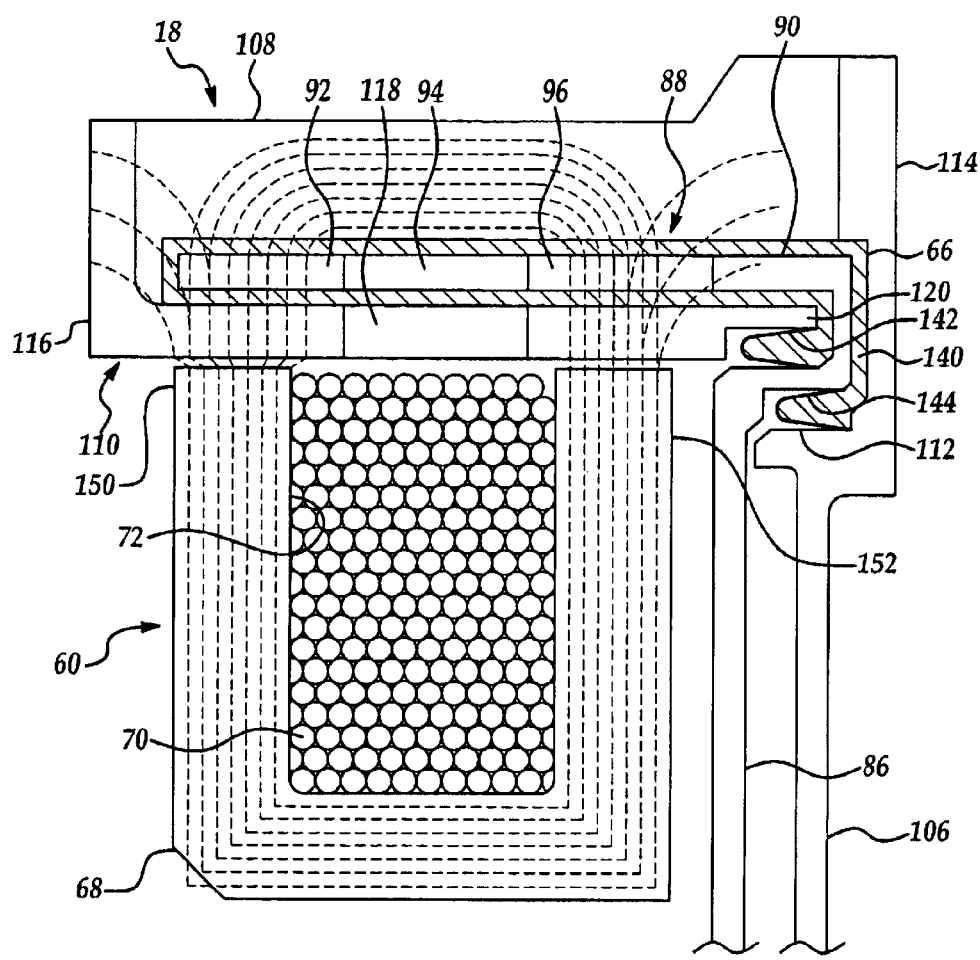
FIG. 2 is a detailed cross-sectional side view of the magneto-rheological damper assembly of the present invention illustrating the shaped lines of magnetic flux in the generated magnetic field.

As shown in greater detail in FIG. 2, the flux shaping ring 110 and the flux channeling ring 108 of the outer disk assembly 64 operatively surround the flux shaping ring 88 of the inner disk assembly 62 forming the "U-shaped" magneto-rheological fluid cavity 66, which retains a magneto-rheological fluid 140. A first annular seal 142 is retained in a slot at the end of the flux-shaping ring 110 of the outer disk assembly 64 and is in sliding contact with the hooked end 90 of the riser portion 86 of the inner ring assembly 62. A second annular seal 144 is retained in sliding contact between the ledge 112 in the riser portion 106 of the outer disk assembly 64 and the hooked end 90 of the riser portion 86 of the inner ring assembly 62. The first and second seals 142, 144 close off the edges of the magneto-rheological fluid cavity 66 and prevent leakage of the magneto-rheological fluid 140. In the preferred embodiment, the seals 142, 144, are of a Teflon double-lip type with an internal metallic spring to provide an outwardly directed sealing force.

Magneto-rheological (MR) fluids belong to the class of controllable fluids. When exposed to a magnetic field, MR fluids reversibly change from an initial free flowing, viscous state to a semi-solid having a controllable yield strength. MR fluids include suspensions of micron-sized, magnetizable particles in a carrier liquid. The particles are typically iron or an iron based alloy. In the presence of an applied magnetic field, the particles become bipolar and align with the magnetic field forming linear, columnar chains parallel to the flux lines of the field. Within a few milliseconds after the application of the magnetic field, the aligned particles essentially solidify and restrict the viscous movement of the fluid. The change in viscosity of the MR fluid is relative to the strength of the magnetic field. By varying the strength of the magnetic field, the yield stress of the MR fluid is precisely controlled. The MR fluid best suited to the present invention is a silicone oil based fluid having Part No. MRF-33AG produced by the Lord Corporation of Cary, N.C. An oil based fluid having Part No. MRF-132LD also produced Lord Corporation may be used with the present invention depending upon the application.

Thus, as the yield stress of the MR fluid 140 is controlled by varying the strength of the applied magnetic field from the magnetic coil 68, the angular movement between the inner disk assembly 62 and the outer disk assembly 64 in controlled, which adds additional hysteresis to the fixed amount of hysteresis provided by the damping members 16. In other words, by applying a magnetic field to the MR fluid 140 contained in the MR fluid cavity 66, the MR fluid thickens and adds damping resistance to the interaction between the input member 12 and the output member 14. This provides a supplemental and variable hysteresis to the fixed hysteresis provided by the damping members 16. It should be appreciated that the selective control of the generation and strength of the magnetic field and thus the controlled variation of the hysteresis of the magneto-rheological damper assembly 18 is under the control of a higher level control device that is beyond the scope of this invention. The present invention may be, for example, under the operative control of an on-board ECU (engine control unit) or computer such as a transmission control computer. Regardless, the structure of the present invention allows for dynamic operative control and variation of the hysteresis of the variable torsional damper 10 by the control over the magnetic field applied to the MR fluid 140.

To precisely control the viscous nature and yield stress of an MR fluid device, the lines of flux of the magnetic field must be shaped to pass through the MR fluid perpendicularly to the shear face of the MR fluid. As illustrated in the embodiment of the present invention, the shear face of the MR fluid 140 in the MR fluid cavity 66 is in the rotational direction of the inner and the outer disk assemblies 62 and 64. Thus, the lines of magnetic flux must be directed from the magnetic coil 68 outward toward the flux-channeling ring 108, so that they are perpendicular to the MR fluid cavity 66. As shown in FIG. 2, as the magnetic coil 68 is energized two magnetic poles 150 and 152 are created. Due to their relatively close proximity, strong lines of magnetic flux are generated between the two poles 150, 152. The lines of magnetic flux that flow between the two poles are shaped to perpendicularly pass through the MR fluid 140 by the flux shaping rings 88 and 110 and the flux channeling ring 108. More precisely, the non-magnetic stainless steel center rings 94 and 118 of the flux shaping rings 88 and 110 block the flux lines and force them to continue outward away from the poles 150, 152. Then the flux-channeling ring 108 allows the flux lines to pass through and connect. Additionally, the non-magnetic stainless steel risers 86 and 106 block any lateral migration of the magnetic flux lines so that the field is directed outward toward the flux-channeling ring 108. Thus, the magnetic field, and more precisely, the magnetic lines of flux, are directed perpendicularly through the MR fluid 140 for precise control of the yield stress and thereby the hysteresis of the magneto-rheological damper assembly 18. In this way, the damper assembly 18 works in connection with the damping members 16 to provide a torsional damper 10 that can effectively handle instances of high hysteresis.

Thus, the variable torsional damper of the present invention adequately addresses the problems associated with high hysteresis during launch and low hysteresis at high rotational speeds after launch in a selectively controlled manner. Further, the variable torsional damper of the present invention is mechanically simple, does not add prohibitive weight, or cost to the assembly, and thereby effectively addresses and overcomes the problems posed by the conventional torsional dampers.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A variable torsional damper rotatably supported for translating torque between a prime mover and the input of a transmission, said variable torsional damper comprising:

a torque input member operatively connected for rotation with the power take off of a prime mover, an output member operatively connected for rotation with the input to a transmission and a plurality of damping elements interposed between said input member and said output member, said damping members acting to translate torque between said input and said output members and to dampen torsional forces generated between the prime mover and the transmission; and a magneto-rheological damper assembly including a magnetic coil assembly, an inner disk assembly, and an outer disk assembly, said magnetic coil assembly having a winding that is adapted to provide a magnetic field having two magnetic poles when selectively energized, said inner disk assembly having a riser portion and a flux-shaping ring, said flux-shaping ring mounted to said riser portion and operatively supported about said magnetic coil such that the magnetic lines of flux generated by said magnetic coil assembly flow through said flux-shaping ring, said inner disk assembly operatively supported by said input member and said outer disk assembly operatively supported by said output member such that said magneto-rheological damper assembly is disposed in parallel with said damping elements and adapted to operatively vary the hysteresis between said input member and said output member such that said variable torsional damper is operable to selectively add additional hysteresis to that provided by said damping members.

2. A variable torsional damper as set forth in claim 1 wherein said outer disk assembly further includes a riser portion, a flux-channeling ring, and a flux-shaping ring, said flux-channeling ring mounted to said riser portion and said flux-shaping ring mounted to said flux-channeling ring, such that said flux-channeling ring and said flux-shaping ring operatively surround said flux shaping ring of said inner disk assembly thereby forming a magneto-rheological fluid cavity.

3. A variable torsional damper as set forth in claim 1 wherein said magneto-rheological damper assembly further includes magneto-rheological fluid such that said magneto-rheological fluid is influenced by the magnetic lines of flux generated by said magnetic field to cause a damping effect between said inner disk assembly and said outer disk assembly.

4. A variable torsional damper as set forth in claim 3 wherein said flux-shaping ring of said inner disk assembly further includes a two outer rings and a center ring, said outer rings formed of a magnetically permeable material and said center ring formed of a non-magnetically permeable material and adapted to block the generated magnetic lines of flux and cause them to flow through said two outer rings.

5. A variable torsional damper as set forth in claim 4 wherein said flux-shaping ring of said outer disk assembly further includes two outer rings and a center ring, said outer rings formed of a magnetically permeable material and said center ring formed of a non-magnetically permeable material, said center ring adapted to block the generated magnetic lines of flux and cause them to flow through said two outer rings.

6. A variable torsional damper as set forth in claim 5 wherein said flux-channeling ring of said outer disk assembly is formed of a magnetically permeable material that is adapted to cause the generated magnetic lines of flux to flow between said two magnetic poles of said magnetic coil assembly after flowing through said flux-shaping rings of said inner and said outer disk assemblies thereby providing a perpendicular flow of magnetic flux lines through said magneto-rheological fluid cavity.

7. A variable torsional damper as set forth in claim 6 wherein said inner disk assembly further includes a plurality of slots and said outer disk assembly further includes a like plurality of slots, each of said plurality of slots adapted to receive a like plurality of pushrods, said pushrods adapted to transfer force from a first throwout bearing to a second throwout bearing to cause the disengagement of said pressure plate.

8. A variable torsional damper rotatably supported for translating torque between a prime mover and the input of a transmission, said variable torsional damper comprising:
   a torque input member operatively connected for rotation with the power take off of a prime mover, an output member operatively connected for rotation with the input to a transmission and a plurality of damping members interposed between said input member and said output member, said damping members acting to translate torque between said input and said output members and to dampen torsional forces generated between the prime mover and the transmission; and
   a magneto-rheological damper assembly having a magnetic coil assembly, an inner disk assembly, and an outer disk assembly, said magnetic coil assembly including a winding that is adapted to provide a selectively variable magnetic field having two magnetic poles when selectively energized, said inner disk assembly operatively supported by said input member and including a riser portion and a flux-shaping ring, said flux-shaping ring mounted to said riser portion and operatively supported about said magnetic coil assembly such that the magnetic lines of flux generated by said magnetic coil assembly flow through said flux-shaping ring, said outer disk assembly operatively supported by said output member such that said magneto-rheological damper assembly is disposed in parallel with said damping members, and magneto-rheological fluid operatively disposed between said inner disk and said outer disk such that said magneto-rheological fluid is influenced by said magnetic field to cause additional hysteresis to be added to that provided by said damping members.

9. A variable torsional damper as set forth in claim 8 wherein said outer disk assembly further includes a riser portion, a flux-channeling ring, and a flux-shaping ring, said flux-channeling ring mounted to said riser portion and said flux-shaping ring mounted to said flux-channeling ring, such that said flux-channeling ring and said flux-shaping ring operatively surround said flux shaping ring of said inner disk assembly thereby forming a magneto-rheological fluid cavity.

10. A variable torsional damper as set forth in claim 9 wherein said magneto-rheological fluid cavity retains said magneto-rheological fluid such that said magneto-rheological fluid is influenced by the magnetic lines of flux generated by said two magnetic poles of said magnetic coil to cause a damping effect between said inner disk assembly and said outer disk assembly.

11. A variable torsional damper as set forth in claim 10 wherein said flux-shaping ring of said inner disk assembly further includes two outer rings and a center ring, said outer rings formed of a magnetically permeable material and said center ring formed of a non-magnetically permeable material and adapted to block the generated magnetic lines of flux and cause them to flow through said two outer rings.

12. A variable torsional damper as set forth in claim 11 wherein said flux-shaping ring of said outer disk assembly further includes two outer rings and a center ring, said outer rings formed of a magnetically permeable material and said center ring formed of a non-magnetically permeable material, said center ring adapted to block the generated magnetic lines of flux and cause them to flow through said two outer rings.

13. A variable torsional damper as set forth in claim 12 wherein said flux-channeling ring of said outer disk assembly is formed of a magnetically permeable material that is adapted to cause the generated magnetic lines of flux to flow between the two poles of said magnetic coil assembly after flowing through said flux-shaping rings of said inner and said outer disk assemblies, thereby providing a perpendicular flow of magnetic flux lines through said magneto-rheological fluid cavity.

14. A variable torsional damper as set forth in claim 13 wherein said inner disk assembly further includes a plurality of slots and said outer disk assembly further includes a like plurality of slots, each of said plurality of slots adapted to receive a like plurality of pushrods, said pushrods adapted to transfer force from a first throwout bearing to a second throwout bearing to cause the disengagement of said pressure plate.

15. A variable torsional damper rotatably supported for translating torque between a prime mover and the input of a transmission, said variable torsional damper comprising:
   a torque input member operatively connected for rotation with the power take off of a prime mover, an output member operatively connected for rotation with the input to a transmission and a plurality of damping members interposed between said input member and said output member, said damping members acting to translate torque between said input and said output members and to dampen torsional forces generated between the prime mover and the transmission;
   a magneto-rheological damper assembly having an inner disk assembly that is operatively supported by said input member, an outer disk assembly that is operatively supported by said output member such that said magneto-rheological damper assembly is disposed in parallel with said damping members, and a magnetic coil assembly having two poles that is adapted to provide a magnetic field when selectively energized;
   said inner disk assembly including a flux-shaping ring and said outer disk assembly including a flux-shaping ring and a flux-channeling ring, said flux-shaping ring and a flux-channeling ring of said outer disk assembly operatively surrounding said flux-shaping ring of said inner disk assembly and forming a magneto-rheological fluid cavity that retains magneto-rheological fluid;
   said flux-shaping rings of said inner disk assembly and said outer disk assembly each having two outer rings and a center ring, said outer rings formed of a magnetically permeable material and said center ring formed of a non-magnetically permeable material and adapted to block the generated magnetic lines of flux and cause them to flow through said two outer rings, said flux-channeling ring of said outer disk assembly is formed of a magnetically permeable material that is adapted to cause the generated magnetic lines of flux to flow between the two poles of said magnetic coil assembly after flowing through said flux-shaping rings of said inner and said outer disk assemblies, such that the magnetic lines of flux generated by said magnetic field are shaped by said flux shaping portions to provide a perpendicular flow of magnetic flux lines through said cavity to cause said magneto-rheological fluid to be influenced to selectively add additional hysteresis to that of the damping members.

* * * * *